L. S. WHITEHEAD.
VISE.
APPLICATION FILED MAR. 11, 1912.
1,055,959.
Patented Mar. 11, 1913.
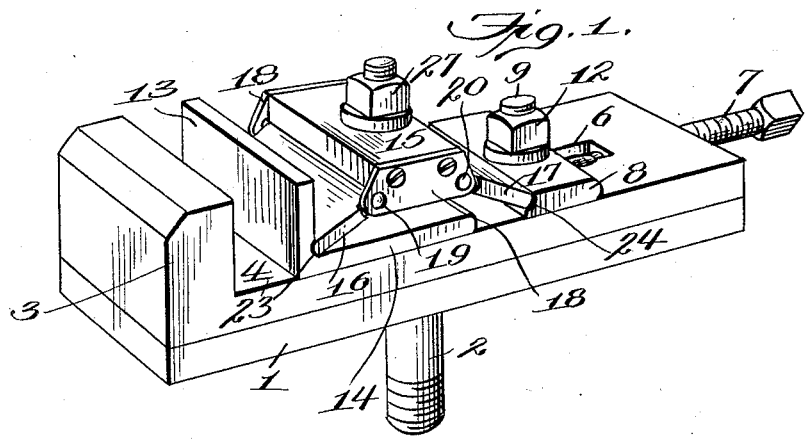
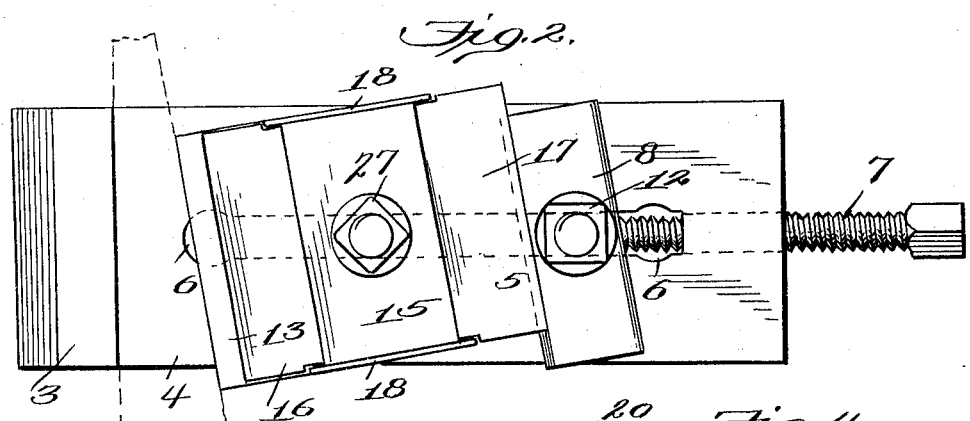
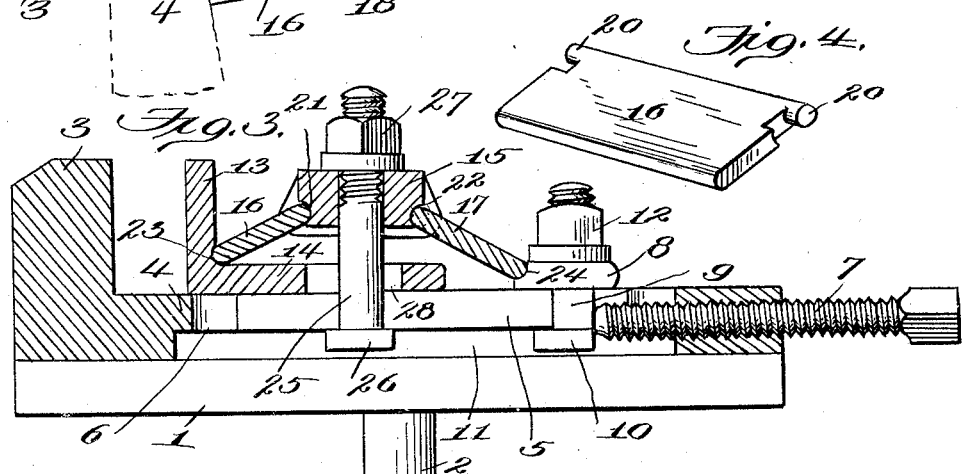
Witnesses:
Inventor
Leo S. Whitehead

UNITED STATES PATENT OFFICE.

LEO S. WHITEHEAD, OF WHEELING, WEST VIRGINIA.

VISE.

1,055,959.  Specification of Letters Patent.  Patented Mar. 11, 1913.

Application filed March 11, 1912. Serial No. 682,939.

*To all whom it may concern:*

Be it known that I, LEO S. WHITEHEAD, a citizen of the United States, residing at Wheeling, in the county of Ohio and State of West Virginia, have invented new and useful Improvements in Vises, of which the following is a specification.

My present invention relates to improvements in vises or work holders, and it has for its object primarily to provide a relatively simple and improved vise which is capable of accommodating itself to the shape of the object or work to be secured and of obtaining a firm hold thereon, particularly in those cases where the object is of irregular shape, that is to say, the object does not present parallel or regular surfaces to the jaws of the vise. In this respect, the device is especially useful as a work holder in connection with shapers, planers, and other machine tools as well as being useful for general purposes.

Further objects of the invention are to provide in compact form, means for strongly closing the jaws to grip the object, such means compensating for the irregular shapes of the objects, and to provide means for readily adjusting the range of movement of the jaws so that the vise may be readily adapted to receive objects of different dimensions.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 is a perspective view of a vise or work holder constructed in accordance with the present invention; Fig. 2 is a top plan view of the vise as shown in Fig. 1 and showing diagrammatically the manner in which the same accommodates itself to objects of irregular shape or form; Fig. 3 represents a longitudinal section through the vise; and Fig. 4 is a detail perspective view of one of the elements of the jaw closing and locking means.

Similar parts are designated by the same reference characters in the several views.

It will be understood that the present invention is applicable either to vises adapted for general use or to vises or work holders adapted for use in connection with shapers, planers, or other machine tools. In the present instance, I have shown as an example, a vise or work holder adapted for use upon shapers or planers and constructed in accordance with the present invention, the vise comprising a base 1 which may rest upon a table or other suitable support or surface and it is shown provided with a downwardly extending stem 2 in the form of a bolt whereby the vise may be firmly and immovably secured either to the table of a machine tool or to any other support. One of the jaw members in the present instance is firmly or immovably secured to the base 1, this jaw member embodying a jaw 3 to engage one side of the object and the jaw is formed on or secured rigidly to a guide section 4 which in the present instance lies flatwise upon the top of the base 1 and extends longitudinally thereof. The guide 4 is formed with a longitudinal slot or groove 5 having an enlargement 6 at one or both ends thereof and an adjusting device 7 which in the present instance is in the form of a screw is located at one end of the slot 5 and is movable longitudinally within one end of the slot. One end of the screw or adjusting device 7 coöperates with a follower which controls the range of operation of the jaws. This follower in the present instance comprises an abutment member 8 which is slidable longitudinally on the upper surface of the guide 4 and a bolt 9 which extends downwardly through the slot 5 and is formed with an enlarged head 10 which operates in a lateral enlargement 11 below the slot 5, the bolt also having a nut 12 or equivalent device to bear upon the abutment 8 and when tightened will hold the latter in adjusted position. The screw or adjusting device 7 bears upon the lower portion of the bolt 9 and serves to adjust the latter and the abutment 8 in a direction longitudinally of the guide 4.

An adjustable jaw 13 coöperates with the jaw 3, this adjustable jaw in the present instance having a horizontal rearwardly extending guide 14 which is slidable longitudinally on the upper surface of the stationary guide 4 and, according to the present invention, this adjustable jaw is also capable of angular movement relatively to the length of the guide 4 whereby objects of irregular form may be accommodated between the two jaws. Novel means is provided by the present invention for closing the jaws under relatively heavy pressure, the jaw closing means adapting itself to the different angular positions of the movable jaw 13 due to the irregular shape of the objects or pieces of work. This jaw closing means in the present instance comprises a compression member 15 and a pair of toggle members 16 and 17, the latter in the present instance being in the form of plates and in order to retain them in coöperative relation with the central compression member, they are pivotally connected to the latter. Different constructions may be used for operatively connecting the toggle members to the compression member, the latter in the present instance having a pair of heads 18 secured to its opposite ends and provided with apertures 19, and each toggle member is formed with a pair of pintles 20 which operate in the apertures 19. To relieve the pintles and the toggle members from the strain exerted thereon by the compression member 15, the latter is formed with concave seats 21 and 22, and the adjacent ends of the toggle members are rounded and bear against these respective seats. The outer ends of the toggle members coöperate respectively with the outer side of the adjustable jaw 13 and the adjustable abutment 8. For this purpose, the outer edges of the toggle members are preferably rounded and bear in correspondingly rounded seats 23 and 24 formed respectively at the rear side of the jaw 13 and the forward side of the abutment 8. Different means may be used for operating the compression member 15 in a direction transverse to the line of movement of the adjustable jaw, thereby moving the toggle members 16 and 17 toward alined position so as to close the jaws. In the present instance, a bolt 25 is provided having a head 26 at its lower end which is beneath the longitudinal slot 5 in the stationary guide 4 and is received by the lateral enlargement 11 below said slot, and the upper end of the bolt extends through a central opening 26 in the compression member 15 and is provided with a nut or its equivalent 27 which bears upon the top of the compression member. By screwing the nut down upon the bolt, the compression member is also forced downwardly and operates through the medium of the toggle members to close the jaws, it being understood that the abutment 8 is firmly held in fixed position. This bolt 25 also serves preferably to prevent dislocation of the adjustable jaw 13 for which purpose the rearwardly extending guide 14 of this jaw has a longitudinally extending slot 28 through which the bolt 25 passes.

In using a vise or work holder constructed in accordance with the present embodiment of my invention, the abutment 8 is adjusted roughly in a direction longitudinally of the vise by loosening the bolt 9, suitably setting the screw or adjusting device 7, and then tightening the bolt 9, it being understood that during this rough adjustment, the nut 27 on the bolt 25 is loosened or unscrewed. When the object or piece of work is introduced between the jaws, the movable jaw 13 accommodates itself angularly and otherwise to that surface of the object which it engages, the adjustable jaw being permitted to swing angularly for this purpose as indicated diagrammatically in Fig. 2, and as the jaw 13 shifts in an angular direction, the jaw closing means embodying the compression member 15 and the toggle members 16 and 17 also assumes an angular position, this being permitted by a sliding of the outer edge of the toggle member 17 within the concaved seat 24 in the abutment 8. After the work has been properly placed between the jaws, the nut 27 is tightened, thereby forcing the compression member 15 downwardly and spreading the toggle members 16 and 17, and the latter will then exert a strong pressure upon the object by closing the jaws firmly thereon.

Owing to the compact arrangement of the jaw closing means, the vise is well adapted for use upon the tables of shapers and planers, as the vise and its parts will not interfere with the operation of the tools or cutting mechanisms.

I claim as my invention:—

1. A vise comprising coöperative jaws movable relatively toward and from one another and also relatively movable angularly to accommodate objects of irregular shapes between them, an abutment angularly adjustable on one of the jaws, and means interposed between said abutment and the other jaw for compressing the jaws upon an object irrespective of whether the jaws are in parallelism or angular relation.

2. A vise comprising coöperative jaws movable relatively in a direction toward and from one another and also capable of relative angular adjustment, an adjustable abutment for varying the range of relative movement between the jaws, said abutment having also an angular adjustment on one of the jaws, and jaw closing means interposed between said adjustable abutment and the other jaw.

3. A vise comprising coöperative jaws adjustable relatively in a direction toward and from one another and also capable of relative angular movement, an abutment also adjustable in the direction of relative adjustment of the jaws and capable of angular adjustment to conform to the relative angular adjustment of the jaws, and jaw closing means interposed between said abutment and one of said jaws and shiftable angularly to conform to different angular adjustments of the jaws and abutment.

4. A vise comprising coöperative relatively adjustable jaws, an abutment connected and adjustable angularly relatively to one of said jaws, and jaw closing means interposed between and coöperative with said adjustable abutment and the other jaw, said means being shiftable angularly to conform to different angular adjustments of the abutment.

5. A vise comprising coöperative jaws one of which is adjustable angularly and also in a direction toward and from the other jaw, an abutment adjustable angularly with said adjustable jaw, and toggle mechanism interposed between said adjustable abutment and the adjustable jaw and operative to close the jaws.

6. A vise comprising coöperative relatively adjustable jaws capable of relative angular movement, an adjustable abutment connected to one of said jaws and also capable of relative angular adjustment relatively thereto, a compression member, means for operating it, and toggle members pivotally related to said compression member and bearing respectively against said abutment and one of said jaws, said toggle members being shiftable angularly to conform to different angular adjustments of the abutment.

7. A vise comprising a jaw having a guide connected thereto, a coöperative jaw adjustable longitudinally on said guide and also capable of angular adjustment relatively thereto, an abutment adjustable longitudinally on said guide and also capable of angular adjustment relatively thereto, a compression member, toggle members pivotally related thereto and bearing respectively against said abutment and the adjustable jaw, said compression and toggle members being adjustable longitudinally and angularly with respect to said guide, and operating means for said compression member.

In testimony whereof I have hereunto set my hand in presence of two subscribing witnesses.

LEO S. WHITEHEAD.

Witnesses:
WM. G. CALDWELL,
J. H. LEIGHTON.

---

Copies of this patent may be obtained for five cents each, by addressing the "Commissioner of Patents, Washington, D. C."